(12) United States Patent
Roy et al.

(10) Patent No.: US 9,895,666 B2
(45) Date of Patent: Feb. 20, 2018

(54) COMPOSITE POLYAMIDE MEMBRANE MADE USING SUBSTITUTED BENZAMIDE MONOMER

(71) Applicant: Dow Global Technologies LLC, Midland, MI (US)

(72) Inventors: Abhishek Roy, Edina, MN (US); Tina L. Arrowood, Elko New Market, MN (US); Aman A. Desai, Midland, MI (US); Steven D. Jons, Eden Prairie, MN (US); Mou Paul, Edina, MN (US); XiaoHua Qiu, Midland, MI (US); Steven Rosenberg, Shorewood, MN (US); Ian A. Tomlinson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 369 days.

(21) Appl. No.: 14/648,849

(22) PCT Filed: Jan. 3, 2014

(86) PCT No.: PCT/US2014/010123
§ 371 (c)(1),
(2) Date: Jun. 1, 2015

(87) PCT Pub. No.: WO2014/109947
PCT Pub. Date: Jul. 17, 2014

(65) Prior Publication Data
US 2015/0298066 A1 Oct. 22, 2015

Related U.S. Application Data

(60) Provisional application No. 61/752,057, filed on Jan. 14, 2013.

(51) Int. Cl.
| | | |
|---|---|---|
| *B01D 69/12* | (2006.01) | |
| *B01D 71/56* | (2006.01) | |
| *B01D 71/78* | (2006.01) | |
| *B01D 67/00* | (2006.01) | |
| *C09D 177/00* | (2006.01) | |
| *B01D 61/02* | (2006.01) | |
| *B01D 69/02* | (2006.01) | |
| *C02F 1/44* | (2006.01) | |

(52) U.S. Cl.
CPC ......... *B01D 69/12* (2013.01); *B01D 67/0002* (2013.01); *B01D 69/125* (2013.01); *B01D 71/56* (2013.01); *B01D 71/78* (2013.01); *C09D 177/00* (2013.01); *B01D 61/02* (2013.01); *B01D 69/02* (2013.01); *C02F 1/44* (2013.01)

(58) Field of Classification Search
CPC .............................. B01D 69/125; B01D 71/56
See application file for complete search history.

(56) References Cited

U.S. PATENT DOCUMENTS

| | | |
|---|---|---|
| 3,304,310 A | 2/1967 | Hari et al. |
| 3,600,350 A * | 8/1971 | Kwolek ................. C08G 69/12 524/211 |
| 3,686,116 A | 8/1972 | Rio |
| 3,694,390 A | 9/1972 | Winslow |
| 3,878,109 A | 4/1975 | Ikeda et al. |
| 4,259,183 A | 3/1981 | Cadotte |
| 4,277,344 A | 7/1981 | Cadotte |
| 4,529,646 A | 7/1985 | Sundet |
| 4,606,943 A | 8/1986 | Rak et al. |
| 4,626,468 A | 12/1986 | Sundet |
| 4,643,829 A | 2/1987 | Sundet |
| 4,719,062 A | 1/1988 | Sundet |
| 4,758,343 A | 7/1988 | Sasaki et al. |
| 4,761,234 A | 8/1988 | Uemura et al. |
| 4,769,148 A | 9/1988 | Fibiger et al. |
| 4,783,346 A | 11/1988 | Sundet |
| 4,812,270 A | 3/1989 | Cadotte et al. |
| 4,830,885 A | 5/1989 | Tran et al. |
| 4,872,984 A | 10/1989 | Tomaschke |
| 4,888,116 A | 12/1989 | Cadotte et al. |
| 4,948,507 A | 8/1990 | Tomaschke |
| 4,950,404 A | 8/1990 | Chau |
| 4,960,517 A | 10/1990 | Cadotte |

(Continued)

FOREIGN PATENT DOCUMENTS

| | | |
|---|---|---|
| CN | 1035338 | 9/1989 |
| CN | 1935338 | 3/2007 |
| CN | 102219673 | 10/2011 |
| JP | 53146275 | 12/1978 |
| WO | 2012102942 | 8/2012 |
| WO | 2012102943 | 8/2012 |
| WO | 2012102944 | 8/2012 |
| WO | 2013048762 | 4/2013 |
| WO | 2013048763 | 4/2013 |
| WO | 2014014662 | 1/2014 |
| WO | 2014014663 | 1/2014 |
| WO | 2014014664 | 1/2014 |
| WO | 2014014666 | 1/2014 |
| WO | 2014014668 | 1/2014 |
| WO | 2014014669 | 1/2014 |
| WO | 2014109946 | 7/2014 |
| WO | 2014179024 | 11/2014 |

OTHER PUBLICATIONS

Li et al, Polyamide thin fim composite membranes prepared from isomeric biphenyl tetraacyl chloride and m-phenylenediamine, Jornal of Membrane Science 315, (2008)20-27.
Petersen, composite reverse osmosis and nanofiltration membranes, Journal of Membrane Science 83, (1993) 81-150.

*Primary Examiner* — Alex A Rolland
(74) *Attorney, Agent, or Firm* — Edward W. Black

(57) ABSTRACT

A method for making a composite polyamide membrane comprising a porous support and a thin film polyamide layer, wherein the method includes the steps of applying a polar solution comprising a polyfunctional amine monomer and a non-polar solution comprising a polyfunctional acyl halide monomer to a surface of a porous support and interfacially polymerizing the monomers to form a thin film polyamide layer. The method is characterized by including a substituted benzamide monomer within the non-polar solution.

4 Claims, No Drawings

(56) References Cited

U.S. PATENT DOCUMENTS

| | | |
|---|---|---|
| 5,015,380 A | 5/1991 | Sundet |
| 5,015,382 A | 5/1991 | Sundet |
| 5,019,264 A | 5/1991 | Arthur |
| 5,049,282 A | 9/1991 | Linder et al. |
| 5,051,178 A | 9/1991 | Uemura et al. |
| 5,160,619 A | 11/1992 | Yamaguchi et al. |
| 5,180,802 A | 1/1993 | Hartman et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |
| 5,616,249 A | 4/1997 | Hodgdon |
| 5,693,227 A | 12/1997 | Costa |
| 5,733,602 A | 3/1998 | Hirose et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,245,234 B1 | 6/2001 | Koo et al. |
| 6,280,853 B1 | 8/2001 | Mickols |
| 6,337,018 B1 | 1/2002 | Mickols |
| 6,406,626 B1 | 1/2002 | Murakami et al. |
| 6,464,873 B1 | 10/2002 | Tomaschke |
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,777,488 B1 | 8/2004 | Araki et al. |
| 6,878,278 B2 * | 4/2005 | Mickols ............... B01D 69/125 210/490 |
| 7,279,097 B2 | 10/2007 | Tomioka et al. |
| 7,806,275 B2 | 10/2010 | Murphy et al. |
| 7,815,987 B2 | 10/2010 | Mickols et al. |
| 7,820,767 B2 * | 10/2010 | El-Hibri ..................... C08J 5/18 264/176.1 |
| 8,147,735 B2 | 4/2012 | Buschmann |
| 8,177,978 B2 | 5/2012 | Kurth et al. |
| 2010/0297429 A1 * | 11/2010 | Wang ................. B01D 67/0006 428/319.3 |
| 2012/0248027 A1 | 10/2012 | Sasaki et al. |
| 2012/0261332 A1 | 10/2012 | Takagi et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |
| 2013/0287944 A1 | 10/2013 | Paul et al. |
| 2013/0287945 A1 | 10/2013 | Roy et al. |
| 2013/0287946 A1 | 10/2013 | Jons et al. |
| 2014/0170314 A1 | 6/2014 | Zhang et al. |
| 2014/0199483 A1 | 7/2014 | Roy et al. |
| 2014/0206900 A1 | 7/2014 | Qiu et al. |
| 2014/0272134 A1 | 9/2014 | Roy et al. |
| 2014/0295078 A1 | 10/2014 | Paul et al. |
| 2014/0370191 A1 | 12/2014 | Rosenberg et al. |

* cited by examiner

COMPOSITE POLYAMIDE MEMBRANE MADE USING SUBSTITUTED BENZAMIDE MONOMER

FIELD

The present invention is generally directed toward composite polyamide membranes along with methods for making and using the same.

INTRODUCTION

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and poly-functional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 4,259,183 to Cadotte describes the use of combinations of bi- and tri-functional acyl halide monomers, e.g. isophthaloyl chloride or terephthaloyl chloride with trimesoyl chloride. U.S. Pat. No. 6,878,278 to Mickols describes the addition of a wide range of complexing agents to the acyl halide coating solution, including various phosphorous containing species. US 2011/0049055 describes the addition of moieties derived from sulfonyl, sulfinyl, sulfenyl, sulfuryl, phosphoryl, phosphonyl, phosphinyl, thiophosphoryl, thiophosphonyl and carbonyl halides. U.S. Pat. No. 6,521,130 describes the addition of a carboxylic acid (e.g. aliphatic and aromatic carboxylic acids) or carboxylic acid ester to one or both monomer coating solutions prior to polymerization. Similarly, U.S. Pat. No. 6,024,873, U.S. Pat. No. 5,989,426, U.S. Pat. No. 5,843,351 and U.S. Pat. No. 5,576,057 describe the addition of selected alcohols, ethers, ketones, esters, halogenated hydrocarbons, nitrogen-containing compounds and sulfur-containing compounds having solubility parameters of 8 to 14 $(cal/cm^3)^{1/2}$ to one of the coating solutions. US 2009/0107922 describes the addition of various "chain capping reagents" to one or both coating solutions, e.g. 1,3 propane sultone, benzoyl chloride, 1,2-bis (bromoacetoxy) ethane, etc. U.S. Pat. No. 4,606,943 and U.S. Pat. No. 6,406,626 describe the formation of a thin film polyamide using a polyfunctional amine and polyfunctional acyl halide along with a polyfunctional acid anhydride halide (e.g. trimellitic anhydride acyl chloride). WO2012/102942, WO2012/102943 and WO2012/102944 describe the addition of various monomers including carboxylic acid and amine-reactive functional groups. US 2009/0272692, US 2010/0062156, US 2011/0005997, US 2012/0261344 and U.S. Pat. No. 8,177,978 describe the use of various polyfunctional acyl halides and their corresponding partially hydrolyzed counterparts. U.S. Pat. No. 7,806,275 describes modifying the acyl halide monomer with an electron withdrawing group to minimize chlorination. U.S. Pat. No. 4,812,270 to Cadotte describes post-treating the membrane with phosphoric acid. U.S. Pat. No. 5,582,725 describes a similar post treatment with an acyl halide such as benzoyl chloride. The search continues for new monomers that further improve membrane performance.

SUMMARY

The invention includes a method for making a composite polyamide membrane comprising a porous support and a thin film polyamide layer, wherein the method includes the steps of applying a polar solution comprising a polyfunctional amine monomer and a non-polar solution comprising a polyfunctional acyl halide monomer to a surface of a porous support and interfacially polymerizing the monomers to form a thin film polyamide layer. The method is characterized by including a substituted benzamide monomer within the non-polar solution, wherein the substituted benzamide monomer is distinct from the polyfunctional acyl halide monomer and is represented by at least one of Formulae (IIIa and IIIb):

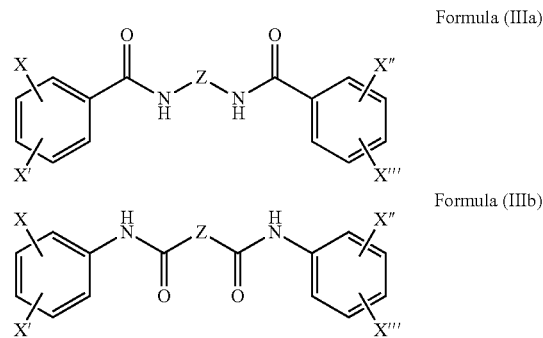

Formula (IIIa)

Formula (IIIb)

wherein:
i) X, X', X" and X''' are independently selected from the following functional groups: acyl halide, carboxylic acid, carboxylate and sulfonic acid which are located meta, ortho or para to the benzyl amide group, or one or both of: a) X and X', and b) X" and X''' collectively form an anhydride group; with the proviso that at least two of X, X', X" and X''' are selected from acyl halide and anhydride functional groups; and
ii) Z is selected from at least one of: aryl, alkyl, alkenyl, and alkoxy wherein each may be unsubstituted or substituted with a functional group selected from: carboxylic acid, carboxylate, phosphonic acid and sulfonic acid;
iii) with the proviso that the substituted benzamide monomer comprises at least one functional group selected from carboxylic acid, carboxylate, phosphonic acid and sulfonic acid. Many additional embodiments are described including applications for such membranes.

DETAILED DESCRIPTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF), micro filtration (MF) and pressure retarded fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 µm and top layer (front side) comprising a thin film polyamide layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as a polar solution. The polar solution may contain from about 0.1 to about 10% w/v and more preferably from about 1 to about 6% w/v polyfunctional amine monomer. Once coated on the porous support, excess solution may be optionally removed.

The polyfunctional acyl halide monomer comprises at least two acyl halide groups and is preferably coated from an organic-based or non-polar solvent although the polyfunctional acyl halide may be delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acyl chloride, terephthalic acyl chloride, isophthalic acyl chloride, biphenyl dicarboxylic acyl chloride, and naphthalene dicarboxylic acid dichloride. Non-limiting examples of alicyclic polyfunctional acyl halides include: cyclopropane tri carboxylic acyl chloride, cyclobutane tetra carboxylic acyl chloride, cyclopentane tri carboxylic acyl chloride, cyclopentane tetra carboxylic acyl chloride, cyclohexane tri carboxylic acyl chloride, tetrahydrofuran tetra carboxylic acyl chloride, cyclopentane dicarboxylic acyl chloride, cyclobutane dicarboxylic acyl chloride, cyclohexane dicarboxylic acyl chloride, and tetrahydrofuran dicarboxylic acyl chloride. One preferred polyfunctional acyl halide is trimesoyl chloride (TMC). The polyfunctional acyl halide may be dissolved in a non-polar solvent in a range from about 0.01 to 10% w/v, preferably 0.05 to 3% w/v and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company.

The non-polar solution may include additional materials including co-solvents, phase transfer agents, solubilizing agents, complexing agents and acid scavengers wherein individual additives may serve multiple functions. Representative co-solvents include: benzene, toluene, xylene, mesitylene, ethyl benzene, diethylene glycol dimethyl ether, cyclohexanone, ethyl acetate, Butyl Carbitol™ acetate, methyl laurate and acetone. A representative acid scavenger includes N, N-diisopropylethylamine (DIEA). U.S. Pat. No. 6,878,278, U.S. Pat. No. 6,723,241, U.S. Pat. No. 6,562,266 and U.S. Pat. No. 6,337,018 describe the addition of a broad range of representative complexing agents that may combined with the non-polar solution prior to conducting the interfacial polymerization. A class of such complexing agents is represented by Formula (I).

$$\alpha(L_x\beta)_y \qquad \text{Formula (I)}$$

where α is a non-sulfur containing binding core selected from elements falling within: (a) Group IIIA-VIB (i.e., Groups IIIA, IVA, VA, VIA, VIIA, VIIIA, IB, IIB, IIIB, IVB, VB, VIB) and (b) Periods 3-6 (i.e., Periods starting with Na, K, Rb, and Cs) of the conventional IUPAC periodic table. Groups IIIA through VIB of the conventional IUPAC form of the Periodic Table corresponds to: Groups 3-16 of the "new notation" IUPAC Periodic Table and Groups IIIB-VIA of the CAS version of the Periodic Table. In order to avoid any confusion further reference herein will utilize the conventional IUPAC Periodic Table, i.e., Group IIIA corresponds to the column starting with Sc, Y, La, etc, and Group VIB corresponds to the column starting with O, S, Se, Te, Po. Particularly preferred binding cores include: Al, Si, P, As, Sb, Se and Te and metals such as: Fe, Cr, Co, Ni, Cu, and Zn. L is an optional chemical linking group, the same or different, selected from linkages such as: carbon containing moieties, e.g., aromatic groups, alkanes, alkenes, —O—, —S—, —N—, —H—, —P—, —O—P—, and —O—P—, (each of which may be substituted or unsubstituted). β is solubilizing group, the same or different, and includes from 1 to 12 carbon atoms which may be substituted or unsubstituted and which may include internal linking groups as defined by L. Examples include aliphatic and arene groups having 1 to 6 carbon atoms, aromatic groups, heterocyclic groups, and alkyl groups. "x" is an integer from 0 to 1 and "y" is an integer from 1 to 5, preferably from 2 to 4. Although dependent upon the specific solvent(s) and acyl halide species utilized, the following complexing agents are generally useful in the subject invention: tri-phenyl derivatives of phosphorous (e.g., phosphine, phosphate), bismuth, arsenic and antimony; alkane oxy esters of phosphorous including tributyl and dibutyl phosphite; organo-metallic complexes such as ferrocene and tetraethyl lead and acetylacetonate complexes of iron (II), iron (III), cobalt (III) and Cr (III). A preferred class of such complexing agents is represented by Formula (II).

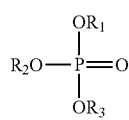

Formula (II)

wherein "P" is phosphorous, "O" is oxygen and $R_1$, $R_2$ and $R_3$ are independently selected from carbon containing moieties. The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc., which may be unsubstituted or substituted (e.g., substituted with amide groups, ether groups, ester groups, sulfone groups, carbonyl groups, anhydrides, cyanide, nitrile, isocyanate, urethane, beta-hydroxy ester, double and triple bonds etc.), and cyclic groups, e.g., cyclo pentyl, cyclo hexyl, aromatics, e.g., phenyl, heterocyclic (e.g., pyridine), etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic linking group, e.g., methyl, ethyl, etc. Preferred carbon containing moieties include unsubstituted, branched or unbranched $C_1$-$C_{12}$ groups, and more preferably $C_1$-$C_8$ aliphatic groups such as: methyl, ethyl, propyl, isopropyl, butyl, 2-methyl butyl, 3-methyl butyl, 2-ethyl butyl, pentyl, hexyl, etc. Additionally, moieties include phenyl groups. When used, the aforementioned complexing agents are preferred added to the organic-based or non-polar coating solution containing the polyfunctional acyl halide monomer in a ratio with the polyfunctional acyl halide monomer of from about 1:5 to 5:1 with 1:1 to 3:1 being preferred. In another preferred embodiment, the concentration of the complexing agent within the coating solutions is from about 0.001 to 2% w/v. Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed).

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

The subject method is characterized by including a substituted benzamide monomer within the non-polar solution along with the polyfunctional acyl halide monomer. While both monomers may include multiple acyl halide functional groups, there are distinct from one another. For example, the polyfunctional acyl halide monomer preferably includes no benzyl amide groups. The non-polar solution preferably comprises at least 0.001% w/v of the substituted benzamide monomer. In another embodiment, the non-polar solution comprises from about 0.001 to 0.25% w/v of the substituted benzamide monomer. In still another embodiment, the non-polar solution comprises the benzyl monomer and polyfunctional acyl halide in a molar ratio of from about 0.001:1 to 1:1, preferably from 0.01:1 to 0.1:1 and more preferably from 0.001:1 to 0.01:1. The non-polar solution may include additional constituents including co-solvents and complexing agents as previously described.

The substituted benzamide monomer is represented by at least one of Formulae (IIIa and IIIb):

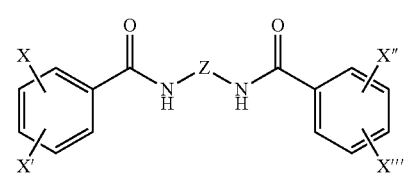

Formula (IIIa)

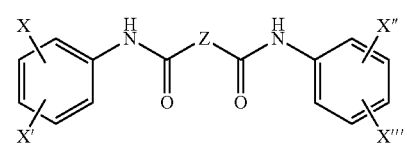

Formula (IIIb)

wherein:
i) X, X', X" and X'" are independently selected from the following functional groups: acyl halide, carboxylic acid, carboxylate (i.e. salts and esters of carboxylic acid), phosphonic acid and sulfonic acid which are located meta, ortho or para to the benzyl amide group; or one or both of: a) X and X', and b) X" and X'" collectively form an anhydride group; with the proviso that at least two of X, X', X" and X'" are selected from acyl halide and anhydride functional groups; and
ii) Z is selected from at least one of: aryl, alkyl, alkenyl, and alkoxy wherein each may be unsubstituted or substituted with a functional group selected from: carboxylic acid, carboxylate, phosphonic acid and sulfonic acid;

iii) with the proviso that the substituted benzamide monomer comprises at least one functional group selected from carboxylic acid, carboxylate, phosphonic acid and sulfonic acid.

The substituted benzamide monomer preferably comprises from 2 to 5 phenyl groups and in several embodiments, comprises at least three phenyl groups. The substituted benzamide monomer should also be sufficiently soluble within the non-polar solution to facilitate incorporation, that solubility being aided as necessary by the use of co-solvents, surfactants or phase transfer reagents. In most preferred embodiments, the substituted benzamide monomer has a molecular weight of from 370 to 900 Daltons, and more preferably from 400 to 800 Daltons. A preferred subclass of monomers is represented by Formula (IV).

Formula (IV)

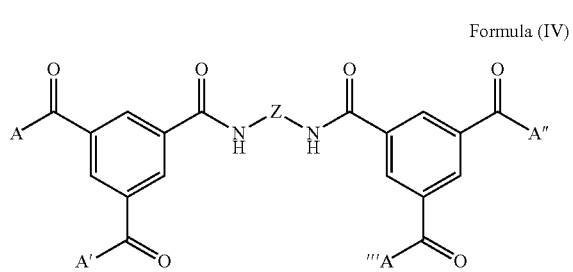

wherein A, A', A" and A''' are independently selected from halogens and hydroxyl. In a preferred subset of embodiments, at least three (and in some instances all) of A, A', A" and A''' are selected from a halogen (e.g. Cl). Representative species are represented in Formulae (V)-(XI).

Formula (V)

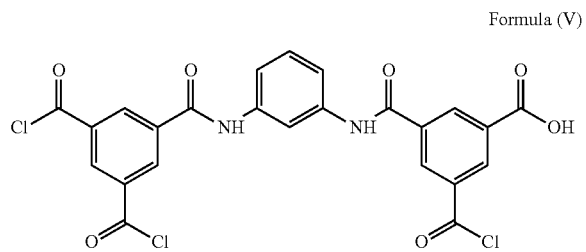

Formula (VI)

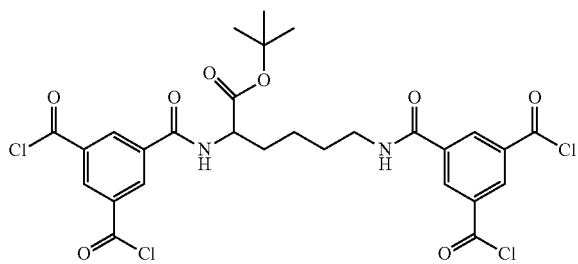

Formula (VII)

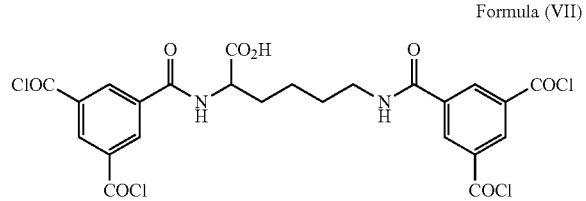

Formula (VIII)

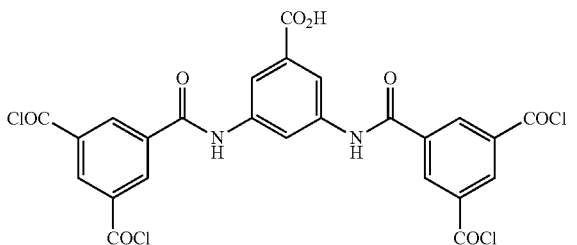

Formula (IX)

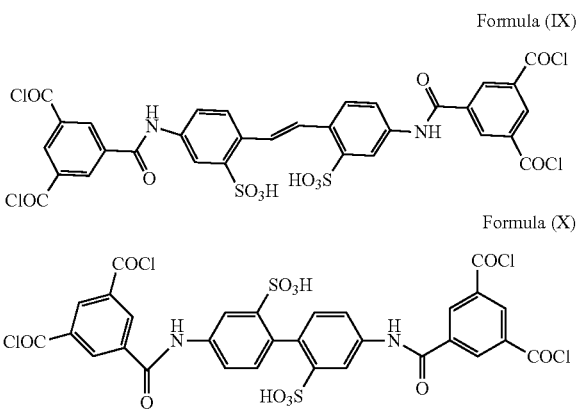

Formula (X)

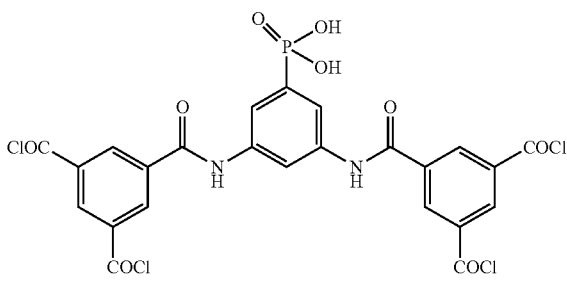

Formula (XI)

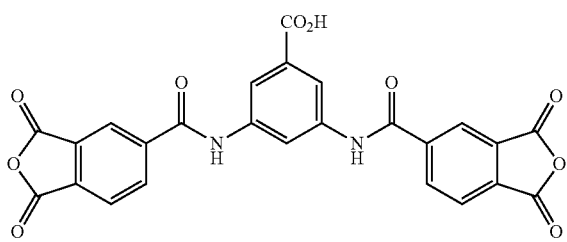

In another subclass of embodiments, a) X and X', and b) X" and X''' collectively form anhydride groups. Non-limiting species are represented by Formulae (XII)-(XIII).

Formula (XII)

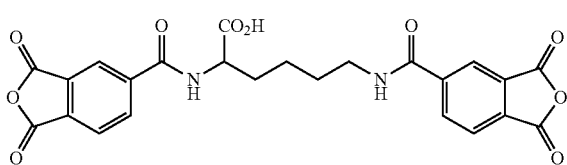

Formula (XIII)

Another applicable monomer is represented by Formula (XIV):

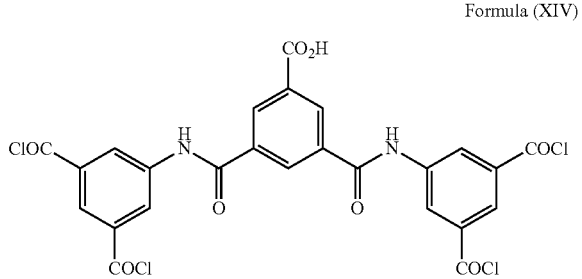

Formula (XIV)

Methods for preparing the substituted benzamide monomers are not particularly limited and include reacting a diamine and polyfunctional acyl halide or anhydride compound. For example, the monomer shown in Formula (XI) can be prepared by reacting 1,3-dioxo-1,3-dihydroisobenzofuran-5-carbonyl chloride with 2,6-diaminohexanoic acid. Additional examples include reacting amino acids (e.g. arginine, histidine, ornithine, etc.) with a polyfunctional acyl halide monomer as described above.

The thin film polyamide layer may optionally include hygroscopic polymers upon at least a portion of its surface. Such polymers include polymeric surfactants, polyacrylic acid, polyvinyl alcohol, polyvinyl acetate, polyalkylene oxide compounds, poly(oxazoline) compounds, polyacrylamides and related reaction products as generally described in U.S. Pat. No. 6,280,853; U.S. Pat. No. 7,815,987; US 2009/0220690 and US 2008/0185332. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

EXAMPLES

All polyamide composite membranes samples were hand-casted upon polysulfone ultrafiltration supports. The polysulfone supports were formed by coating a solution of polysulfone (Udel® P-3500) (~15%) in dimethyl formamide onto a surface of a continuous, non-woven PET web. Phase inversion was initiated by immersing the coated web in water. The resulting support sheet consisted of an asymmetric ultrafiltration membrane layer (approx. 50 micron) upon a PET web (approx. 150 micron). The support sheet was cut into pieces (11 inch×7 inch), attached to wire frames (10 inch×7.5 inch), and dipped in RO water for approximately 30 minutes. The mounted support sheets were then removed from the water and immersed in an aqueous 3% w/v MPD solution for at least approximately 20 minutes. A paper towel was then placed over a flat plastic rectangular board. The MPD soaked support (web side down) was placed on top of the paper towel and excess solution was nipped off by rolling a rubber roller across the support's polysulfone surface. A rectangular silicone rubber gasket was placed on the polysulfone surface, and a similarly-shaped rectangular plastic frame was placed over the gasket and clamped on four sides to make a leak proof seal at the edges. 60 ml of a non-polar solution (Isopar L) including a combination of TMC and substituted benzamide monomer (see below) solution were then poured over the MPD soaked support and allowed to react for approximately 1 minute. Excess liquid was then poured off the top surface of the resulting reverse osmosis membrane sheet. The sheet was rinsed with 80 mL hexane, air-dried for approximately 1 minute and then stored in RO water until testing. For each sample membrane, two coupons were cut and tested with a flat cell test bench using a 2000 ppm NaCl solution at room temperature and 225 psi.

Two different substituted benzamide monomers where used in the experiments. One was prepared by adding an excess of TMC (~10:1 mole ratio) to 3,5-diaminobenzoic acid (DAB) in Isopar L (sample nos. 2-4 and 9-10) and the other was prepared by adding an excess of TMC (~10:1 mole ratio) to lysine in Isopar L (sample nos. 6-7 and 12-13). The resulting benzyl amide solutions were filtered and combined with a TMC solution (in Isopar L) to form the non-polar coating solution described above. The total acid chloride concentration of the non-polar coating solution was kept constant at 0.13% w/v in all the experiments. The substituted benzamide monomer concentration was based upon of volume fraction of substituted benzamide monomer solution compared to the total volume of the non-polar coating solution. An acid scavenger (i.e. N,N-diisopropylethylamine (DIEA)) was included in the non-polar coating solutions used in sample nos. 9 and 13 (in a 2:1 molar ratio with the diamine used to form the substituted benzamide monomer). A solubilizer/complexing agent (tributyl phosphate (TBP)) was included in sample nos. 10 and 12 (in a 1.5:1 molar ratio with the diamine used to form the substituted benzamide monomer).

TABLE 1

| Sample No. | Substituted benzamide monomer Conc. (%) | Avg. Flux (GFD) | Avg. NaCl passage (%) |
|---|---|---|---|
| 1 | 0 (control) | 20 | 0.55 |
| 2 | 0.008 | 20 | 0.63 |
| 3 | 0.035 | 17 | 0.30 |
| 4 | 0.073 | 17 | 0.30 |

TABLE 2

| Sample No. | Substituted benzamide monomer (%) | Avg. Flux (GFD) | Avg. NaCl passage (%) | Std Dev (Flux) | Std Dev (NaCl passage) |
|---|---|---|---|---|---|
| 5 | 0 (control) | 19 | 0.32 | — | — |
| 6 | 0.035 | 20 | 0.31 | 1.87 | 0.04 |
| 7 | 0.073 | 17 | 0.25 | 0.74 | 0.06 |

TABLE 3

| Sample No. | Substituted benzamide monomer (%) | Avg. Flux (GFD) | Avg. NaCl passage (%) | Std Dev (Flux) | Std Dev (NaCl passage) |
|---|---|---|---|---|---|
| 8 | 0 (control) | 21 | 0.65 | 2.8 | 0.12 |
| 9 | 0.073 DAB (+DIEA) | 18 | 0.33 | 1.8 | 0.04 |
| 10 | 0.073 DAB (+TBP) | 19 | 0.34 | 2.9 | 0.09 |

TABLE 4

| Sample No. | Substituted benzamide monomer (%) | Avg. Flux (GFD) | Avg. NaCl passage (%) | Std Dev (Flux) | Std Dev (NaCl passage) |
|---|---|---|---|---|---|
| 11 | 0 (control) | 24 | 0.50 | 0.88 | 0.06 |
| 12 | 0.073 Lysine (+ TBP) | 20 | 0.39 | 2.47 | 0.06 |
| 13 | 0.073% Lysine (+DIEA) | 21 | 0.27 | 1.77 | 0.02 |

As shown by the data provided in Tables 1-4, sample membranes made with the subject substituted benzamide monomers demonstrated generally lower NaCl passage values as compared with control membranes made without such monomers.

The invention claimed is:

1. A method for making a composite polyamide membrane comprising a porous support and a thin film polyamide layer, wherein the method comprises the steps of applying a polar solution comprising a polyfunctional amine monomer and a non-polar solution comprising a polyfunctional acyl halide monomer to a surface of a porous support and interfacially polymerizing the monomers to form a thin film polyamide layer, wherein the method is characterized by including a substituted benzamide monomer within the non-polar solution, wherein the substituted benzamide monomer is distinct from the polyfunctional acyl halide monomer and is represented by at least one of Formulae (IIIa and IIIb):

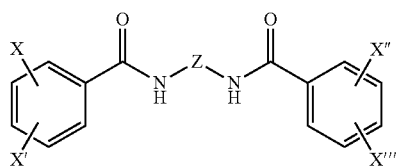

Formula (IIIa)

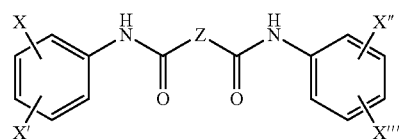

Formula (IIIb)

wherein: i) X, X', X" and X''' are independently selected from the following functional groups: acyl halide, carboxylic acid, carboxylate and sulfonic acid which are located meta, ortho or para to the benzyl amide group, or one or both of: a) X and X', and b) X" and X''' collectively form an anhydride group; with the proviso that at least two of X, X', X" and X''' are selected from acyl halide and anhydride functional groups; and ii) Z is selected from at least one of: aryl, alkyl, alkenyl, and alkoxy wherein each may be unsubstituted or substituted with a functional group selected from: carboxylic acid, carboxylate, phosphonic acid and sulfonic acid;

iii) with the proviso that the substituted benzamide monomer comprises at least one functional group selected from carboxylic acid, carboxylate, phosphonic acid and sulfonic acid.

2. The method of claim 1 wherein the substituted benzamide monomer comprises at least three phenyl groups.

3. The method of claim 1 wherein at least three of X, X', X" and X''' are acyl halide functional groups.

4. The method of claim 1 wherein the substituted benzamide monomer has a molecular weight of from 370 to 900 Daltons.

* * * * *